United States Patent [19]

Miyake et al.

[11] Patent Number: 4,486,277

[45] Date of Patent: Dec. 4, 1984

[54] ELECTROLYTIC CATION EXCHANGE MEMBRANE

[75] Inventors: Haruhisa Miyake; Manabu Suhara; Hiroshi Mori; Yoshihiko Saito, all of Yokohama, Japan

[73] Assignee: Asahi Glass Company Ltd., Tokyo, Japan

[21] Appl. No.: 493,574

[22] Filed: May 11, 1983

[30] Foreign Application Priority Data

May 18, 1982 [JP] Japan .................................. 57-82386

[51] Int. Cl.³ .......................... C25B 1/14; C25B 13/00
[52] U.S. Cl. ..................................... 204/98; 204/128; 204/129; 204/252; 204/296
[58] Field of Search ................. 204/98, 252, 296, 128, 204/129

[56] References Cited

U.S. PATENT DOCUMENTS

| | | | |
|---|---|---|---|
| 4,298,697 | 11/1981 | Baczek | 204/296 |
| 4,316,781 | 2/1982 | Seita | 204/296 |
| 4,337,137 | 6/1982 | Ezzell | 204/296 |

FOREIGN PATENT DOCUMENTS 6887  1/1979  Japan .................................. 204/296

Primary Examiner—John F. Niebling
Attorney, Agent, or Firm—Oblon, Fisher, Spivak, McClelland & Maier

[57] ABSTRACT

An electrolytic cation exchange membrane comprises a first film made of a fluorinated polymer having cation exchange groups and a second film laminated thereon, made of a fluorinated polymer having carboxylic acid groups as its ion exchange groups and containing the following repeating units (A), (B) and (C) and having a smaller thickness and greater specific electric resistance than the first film;

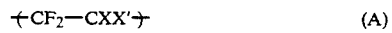

(A)

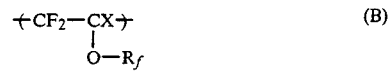

(B)

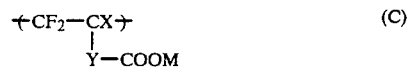

(C)

where each of X and X' is —F, —Cl or —CF$_3$, R$_f$ is a perfluoroalkyl group having from 1 to 10 carbon atoms, M is hydrogen or an alkali metal and Y is selected from the group consisting of —(CF$_2$)$_{\overline{x}}$, —O—(CF$_2$)$_{\overline{x}}$,

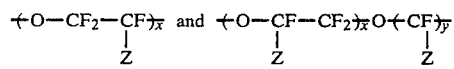

where each of x and y is an integer of from 0 to 10 and Z is —F or R$_f$ as defined above, provided that B/A+B+C (molar ratio) and C/A+B+C (molar ratio) are from 0.01 to 0.3 and from 0.05 to 0.5, respectively.

12 Claims, No Drawings

ELECTROLYTIC CATION EXCHANGE MEMBRANE

BACKGROUND OF THE INVENTION

1. Field of the Invention

The present invention relates to an electrolytic cation exchange membrane. More particularly, the present invention relates to a cation exchange membrane suitable for use in electrolysis of water or an aqueous solution such as an aqueous acidic or alkaline solution, an aqueous alkali metal halide solution or an aqueous alkali metal carbonate solution.

2. Description of the Prior Art

As a process for producing an alkali metal hydroxide and chlorine by the electrolysis of the above-mentioned aqueous solution, particularly an aqueous solution of an alkali metal chloride, a diaphragm method has now been used in place of a mercury method with a view to preventing environmental pollution. Further, in order to efficiently obtain an alkali metal hydroxide having a high purity in a high concentration, it has been proposed and put into practical use to employ an ion exchange membrane.

On the other hand, from the standpoint of energy saving, it is desired to improve the current efficiency and minimize the cell voltage in the electrolysis of this type. For this purpose, various methods have been proposed. However, this object has not yet adequately been attained.

Therefore a need still exists for an improved cation exchange membrane having a high current efficiency and a low cell voltage in the electrolysis of aqueous solutions.

SUMMARY OF THE INVENTION

The present invention provides a novel electrolysis of an aqueous solution can be conducted with high efficiency.

Having now briefly described the invention, a more complete understanding of the invention can be obtained by reference to the description of the preferred embodiments which is provided herein for purposes of illustration only, and is not intended to be limiting unless otherwise specified.

DESCRIPTION OF THE PREFERRED EMBODIMENTS

The present invention provides an electrolytic cation exchange membrane which comprises a first film made of a fluorinated polymer having cation exchange groups and a second film laminated thereon, made of a fluorinated polymer having carboxylic acid groups as its ion exchange groups and containing the following repeating units (A), (B) and (C) and having a smaller thickness and greater specific electric resistance than the first film;

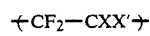 (A)

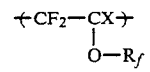 (B)

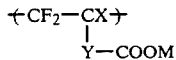 (C)

where each of X and X' is —F, —Cl or —CF$_3$, R$_f$ is a perfluoroalkyl group having from 1 to 10 carbon atoms, M is hydrogen or an alkali metal and Y is selected from the group consisting of $+CF_2 \overline{)_x}$, $-O+CF_2 \overline{)_x}$

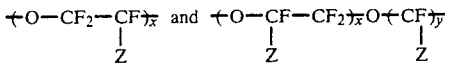

where each of x and y is an integer of from 0 to 10 and Z is —F or R$_f$ as defined above, provided that B/A+B+C (molar ratio) and C/A+B+C (molar ratio) are from 0.01 to 0.3 and from 0.05 to 0.5, respectively.

Now, the present invention will be described in detail with reference to the preferred embodiments.

The cation exchange membrane of the present invention having the above-mentioned construction, gives a superior performance, i.e. high current efficiency and low cell voltage, in the electrolysis. This is attributable to the fact that the second film constituting the cation exchange membrane of the present invention is made of a fluorinated polymer having carboxylic acid groups and containing the above-mentioned repeating units (A), (B) and (C) and it is thereby possible to readily prepare an extremely thin film having a thickness of e.g. from 5 to 40 μm by e.g. extrusion molding even when the cation exchange capacity is relatively small, which used to be difficult with a fluorinated polymer of this type.

Namely, the ion exchange capacity required for a fluorinated polymer having carboxylic acid groups which constitutes a cation exchange membrane may vary depending upon the concentration of the alkali metal hydroxide to be produced by the electrolysis, but the ion exchange capacity is usually required to be relatively small. In such a case, the specific electric resistance of the fluorinated polymer is obliged to be high. In the cation exchange membrane of the present invention, the fluorinated polymer having a small ion exchange capacity and a high specific electric resistance which govern the performance of the membrane is formed into a film having an extremely small thickness, and such a thin film (the second film) is laminated on a film (the first film) having a larger thickness than the first film and made of a fluorinated polymer having a high ion exchange capacity and a small specific electric resistance, whereby superior performance with respect to the current efficiency and the cell voltage in the electrolysis is obtainable without impairing the mechanical strength of the membrane.

In the present invention, the first film of the fluorinated polymer having cation exchange groups should preferably be made to have an ion exchange capacity as large as possible and a specific electric resistance as small as possible so long as adequate mechanical strength can thereby be maintained. The cation exchange groups of the first film may be any groups such as sulfonic acid groups, carboxylic acid groups, phosphonic acid groups or hydroxyl groups.

The content of the cation exchange groups in the first film is selected to have an ion exchange capacity of from 0.5 to 4.0 meq/g dry resin, preferably from 0.8 to 2.0 meq/g dry resin so that the specific electric resistance becomes smaller than that of the second film. In a case where weak acid groups such as carboxylic acid groups, phosphoric acid groups or hydroxyl groups are used as the cation exchange groups, an ion exchange capacity higher than that of the second film is employed.

Various kind of fluorinated polymers may be used for the preparation of the first film. Among them, polymers having the following repeating unit (a) and (b) are preferably used.

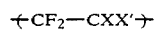
(a)

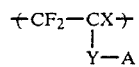
(b)

where X, X' and Y are as defined above, and A is —SO$_3$M, —COOM, —PO$_3$M$_2$, or —OM (where M is as defined above). The molar ratio of (a)/(b) is selected to obtain an ion exchange capacity within the above-mentioned range.

The fluorinated polymers are preferably perfluoropolymers. Preferred perfluoropolymers include a copolymer of CF$_2$=CF$_2$ and CF$_2$=CFOCF$_2$—CF(CF$_3$)OCF$_2$CF$_2$SO$_2$F, a copolymer of CF$_2$=CF$_2$ and CF$_2$=CFO(CF$_2$)$_{2-5}$SO$_2$F, a copolymer of CF$_2$=CF$_2$ and CF$_2$=CFO(CF$_2$)$_{2-5}$COOCH$_3$ and a copolymer of CF$_2$=CF$_2$ and CF$_2$=CFOCF$_2$CF(CF$_3$)OCF$_2$CF$_2$COOCH$_3$.

In the present invention, the fluorinated polymer having carboxylic acid groups as ion exchange groups which constitutes the second film, has the following repeating units (A), (B) and (C):

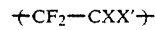
(A)

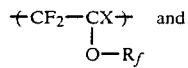
(B)

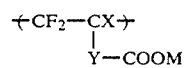
(C)

where X, X', Y, R$_f$ and M are as defined above. Among the fluorinated polymers, perfluoropolymers are preferred. As such perfluoropolymers, there may be mentioned a three component copolymer of CF$_2$=CF$_2$, CF$_2$=CFOR$_f$ (where R$_f$ is a perfluoroalkyl group having from 1 to 3 carbon atoms) and CF$_2$=CFO(CF$_2$)$_{1-4}$COOCH$_3$ or a three component copolymer of CF$_2$=CF$_2$, CF$_2$=CFOR$_f$ (where R$_f$ is as defined above) and CF$_2$=CFOCF$_2$CF(CF$_3$)O(CF$_2$)$_{1-3}$COOCH$_3$.

The ratio of the repeating units (A), (B) and (C) in the fluorinated polymer is important since the ratio determines the property of the film. Namely, B/A+B+C (molar ratio) is attributable to the fabricability of the film and is preferably within a range of from 0.01 to 0.3, more preferably from 0.03 to 0.2. If the molar ratio is small, the improvement in the film fabricability tends to be small. On the other hand, if the molar ratio is too great, the mechanical strength of the film tends to decrease. Whereas, C/A+B+C (molar ratio) is attributable to the ion exchange capacity of the film, and the molar ratio is optionally selected to give a proper ion exchange capacity depending upon the concentration of the alkali metal hydroxide to be produced by the electrolysis. The molar ratio is usually selected to give an ion exchange capacity of from 0.5 to 2.0 meq/g dry resin, preferably from 0.7 to 1.5 meq/g dry resin, further preferably from 0.8 to 1.5 meq/g dry resin.

The fluorinated polymers for the first and second films may be prepared by various methods. Further, these films may optionally be reinforced by a woven fabric such as cloth or net, a non-woven fabric or a fibril made of a fluorinated polymer such as polytetrafluoroethylene or by a metal mesh or a foraminous metal sheet.

In order to maximize the performance of the ion exchange membrane by the combination of the first and second films of fluorinated polymers according to the present invention, the first film is preferably made to have a thickness of from 100 to 700 μm, more preferably, from 150 to 500 μm, further preferably 150 to 300 μm and the second film is preferably made to have a thickness of from 5 to 50 μm, more preferably from 150 to 300 μm, further preferably from 10 to 30 μm, and the ratio of the thickness of the first film to the thickness of the second film is preferably selected to be from 1.0 to 50, more preferably from 2.0 to 30, further preferably from 5 to 20. In a case where the second film is extremely thin, the above-mentioned reinforcing material is preferably introduced to the first film.

For the lamination of the first and second films, an optional method may be employed, and in any case, the two films must be integrated by the lamination. For instance, the lamination is carried out by pressing them preferably at a temperature of from 100° to 350° C. under pressure of from 0.5 to 100 kg/cm$^2$. In the present invention, in some cases, two or more different kinds of films may be used for the first film or the second film or for both the first and second films for the lamination. When the two films are laminated, the respective cation exchange groups should take a suitable form not to lead to decomposition thereof. For instance, in the case of carboxylic acid groups, they should preferably take a form of an acid or an ester at the time of lamination, and in the case of sulfonic acid groups, they should preferably take a form of —SO$_2$F at the time of lamination. The thickness of the cation exchange membrane obtained by the lamination is preferably from 80 to 500 μm, more preferably from 100 to 300 μm.

The cation exchange membrane of the present invention thus obtained by the lamination of the first and second films, exhibits superior performance by itself. However, if desired, a gas and liquid permeable porous layer containing catalytically active particles (U.S. Pat. No. 4,224,121) or a gas and liquid permeable porous layer containing catalytically inactive particles (U.K. Published Patent Application No. 2064586) may be provided on one side or both sides of the membrane to further improve its performance.

The cation exchange membrane of the present invention is useful for the electrolysis of various aqueous solutions, particularly an aqueous alkali metal chloride solution as mentioned above. For instance, when used for the electrolysis of an aqueous alkali metal chloride solution, the cation exchange membrane of the present invention is disposed so that the first film faces the anode side and the second film faces the cathode side, whereby the cation exchange membrane of the present invention exhibits the maximum performance.

The electrolysis of an aqueous alkali metal chloride solution with use of the cation exchange membrane of the present invention, may be conducted under such known conditions as disclosed in the above-mentioned Japanese Unexamined Patent Publication No. 112398/1979. For instance, while supplying an aqueous alkali metal hydroxide solution of preferably from 2.5 to 5.0N to the anode compartment and water or a diluted alkali metal hydroxide to the cathode compartment, the electrolysis is conducted preferably at a temperature of from 80° to 120° C. at a current density of from 10 to 100 A/dm$^2$. In such case, it is advisable to minimize heavy metal ions such as calcium or magnesium in the aqueous alkali metal hydroxide solution, as such heavy metal ions tend to lead to degradation of the cation exchange membrane. Further, in order to minimize the generation of oxygen at the anode, an acid such as hydrochloric acid may be added to the aqueous alkali metal hydroxide solution.

The electrolytic cell used in the present invention may be a monopolar or bipolar type so long as it has the above-mentioned structure. The electrolytic cell used in the electrolysis of an aqueous solution of an alkali metal chloride, is made of a material being resistant to the aqueous solution of the alkali metal chloride and chlorine such as valve metal like titanium in the anode compartment and is made of a material being resistant to an alkali metal hydroxide and hydrogen such as iron, stainless steel or nickel in the cathode compartment.

When the electrodes are placed in the electrolytic cell of the present invention, they may be disposed to contact the ion exchange membrane, or they may be placed with an appropriate space from the ion exchange membrane.

In the foregoing, the use of the membrane of the present invention has been described primarily with respect to the electrolysis of an aqueous alkali metal chloride solution. However, it should be understood that the membrane of the present invention is likewise applicable to the electrolysis of water, a halogen acid (hydrochloric acid or hydrobromic acid) or an alkali metal carbonate.

Having now generally described the invention, a more complete understanding of the invention can be obtained by reference to the Examples which are provided herein for the purpose of illustration only and are not intended to limit the present invention unless otherwise specified.

EXAMPLES

EXAMPLE 1

Into a 10 l stainless steel pressure reactor, 6500 g of deionized water, 13 g of $C_8F_{17}COONH_4$, 32.5 g of $Na_2HPO_4.12H_2O$, 19.5 g of $NaH_2PO_4.2H_2O$ and 1.7 g of $(NH_4)_2S_2O_3$ were fed and then 1300 g of $CF_2=CFO(CF_2)_3COOCH_3$ was fed. After thoroughly deaerating with liquid nitrogen, the temperature was raised to 57° C., and 11.0 kg/cm$^2$ of tetrafluoroethylene was introduced and reacted. During the reaction, tetrafluoroethylene was continuously introduced into the system to maintan the pressure at 11.0 kg/cm$^2$. 4.5 Hours later, the reaction was terminated and the obtained latex was flocculated by means of concentrated sulforic acid. The polymer thereby obtained was thoroughly washed with water, then treated in methanol at 65° C. for 16 hours and dried to obtain 1520 g of a copolymer having an ion exchange capacity of 1.44 meq/g. To the copolymer, 2.7% by weight of PTFE particles (Teflon 6J) were added and the mixture was kneaded by kneading rolls to fibrilate PTFE and then extruded at 230° C. to form a film having a thickness of 260 μm.

Into the same reactor, 6500 g of deionized water, 13 g of $C_8F_{17}COONH_4$, 32.5 g of $Na_2HPO_4.12H_2O$, 19.5 g of $NaH_2PO_4.2H_2O$, 1.7 g of $(NH_4)_2S_2O_3$ and 0.46 g of isopropanol were fed and then 845 g of $CF_2=CFO(CF_2)_3COOCH_3$ and 450 g of $CF_2=CFOC_3F_7$ were fed. After deaerating with liquid nitrogen, the temperature was raised to 57° C. and 12.4 kg/cm$^2$ of tetrafluoroethylene was introduced and reacted. During the reaction, tetrafluoroethylene was introduced from outside to maintain the pressure at 12.4 kg/cm$^2$. 4.5 Hours later, the obtained latex was treated in the same manner as above, whereby 1290 g of a three component copolymer having an ion exchange capacity of 0.86 meq/g was obtained. The three component copolymer was extruded at 230° C. to form a thin film having a thickness of 20 μm.

Then, the two types of films were laminated at 230° C. by means of rolls to obtain a double-layered membrane. The membrane was hydrolyzed in an aqueous solution containing 12% by weight of sodium hydroxide. With use of this membrane, electrolysis was carried out in the following manner.

By means of a small scale electrolytic cell having an effective membrane surface area of 0.25 dm$^2$, an anode of RuO$_2$ coated on Ti expanded metal, a cathode of active nickel coated on Fe expanded metal and an electrode distance of 3 mm, an electrolytic test was carried out at 90° C. under a current density of 20 A/dm$^2$ while supplying 300 g/l of NaCl and water to the anode compartment and the cathode compartment, respectively. As the results, the cell voltage was 3.07 V and the current efficiency was 96.0% when the concentration of the formed sodium hydroxide was 22% by weight.

EXAMPLE 2

The two types of films obtained in Example 1 were laminated at 230° C. by means of rolls.

Then, a mixture comprising 10 parts by weight of silicon carbide powder having an average particle size of 2 μm, 1 part by weight of polytetrafluoroethylene particles, 0.3 part by weight of methyl cellulose (a 2% aqueous solution), 14 parts by weight of water, 2 parts by weight of cyclohexanol and 1 part by weight of cyclohexanone, was kneaded to obtain a paste. The paste was applied by screen-printing onto the surface on one side (the three component copolymer layer having an ion exchange capacity of 0.86 meq/g) of the above-mentioned laminated membrane, then dried and solidified. The amount of the deposition of the silicon carbide was 1.0 mg per 1 cm$^2$ of the membrane surface. Then, a paste prepared in the same manner as above except that oxidized zirconia having an average particle size of 7 μm was used, was applied on the surface on the other side (the copolymer layer having an ion exchange capacity of 1.44 meq/g) of the laminated membrane, then dried and solidified to obtain a deposition of 0.95 mg/cm$^2$. The membrane thus prepared was hydrolyzed in an aqueous solution containing 12% by weight of sodium hydroxide, and electrolysis was conducted in the same manner as in Example 1. As the results, the current efficiency was 96.0% and the cell voltage was 2.87 V to obtain sodium hydroxide at a concentration of 22% by weight. On the other hand, the current efficiency was 92.5% and the cell voltage was 2.98 to obtain sodium hydroxide at a concentration of 35% by weight.

EXAMPLE 3

Into a 10 l stainless steel pressure reactor, 6500 g of deionized water, 13 g of $C_8F_{17}COONH_4$, 32.5 g of Na$_2$HPO$_4$.12H$_2$O, 19.5 g of NaH$_2$PO$_4$.2H$_2$O, 5.2 g of (NH$_4$)$_2$S$_2$O$_3$ and 2.6 g of NaHSO$_3$ were fed, and then 1950 g of CF$_2$=CFO(CF$_2$)$_3$COOCH$_3$ was fed.

After thoroughly deaerating with liquid nitrogen, the temperature was raised to 40° C., and 5.1 kg/cm$^2$ of tetrafluoroethylene was introduced and reacted. During the reaction, tetrafluoroethylene was continuously introduced to the system to maintain the pressure at 5.1 kg/cm$^2$. 9.5 Hours later, the reaction was terminated, and the obtained latex was flocculated by means of concentrated sulfuric acid. The polymer thereby obtained was thoroughly washed with water and then treated in menthanol at 65° C. for 16 hours, whereby 1600 g of a copolymer having an ion exchange capacity of 1.80 meq/g was obtained. To the copolymer, 5.5% by weight of PTFE particles (Teflon 6J) was added, and the mixture was kneaded at 130° C. by means of kneading rolls to fibrilate PTFE and then extruded at 230° C. to form a film having a thickness of 200 μm. To this film, the film of the three component copolymer having an ion exchange capacity of 0.86 meq/g which was obtained in Example 1, having a thickness of 30 μm, was laminated at 230° C. by means of rolls to obtain a double-layered membrane. Then, in the same manner as in Example 2, 0.96 mg/m$^2$ of zirconium oxide was deposited on one side (the polymer layer having an ion exchange capacity of 1.80 meq/g) of the double-layered membrane and 1.02 mg/m$^2$ of silicon carbide was deposited on the other side (the three component copolymer layer having an ion exchange capacity of 0.86 meq/g) of the membrane.

Then, the membrane thus prepared was hydrolyzed in an aqueous solution containing 12% by weight of sodium hydroxide, and electrolysis was conducted in the same manner as in Example 1. As the results, the current efficiency was 95.5% and the cell voltage was 2.69 V to obtain sodium hydroxide at a concentration of 22% by weight.

EXAMPLE 4

A polymer having an ion exchange capacity of 1.18 meq/g, obtained by copolymerizing tetrafluoroethylene with

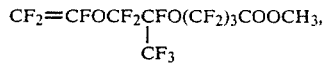

was formed into a film having a thickness of 260 μm. To this film, the film of the three component copolymer having an ion exchange capacity of 0.86 meq/g which was obtained in Example 1, having a thickness of 10 μm, was laminated. The membrane thus obtained was hydrolyzed in an aqueous solution containing 12% by weight of sodium hydroxide, and the ohmic loss of the membrane was measured. The ohmic loss of the membrane was 0.35 V.

EXAMPLE 5

A polymer having an ion exchange capacity of 1.1 meq/g, obtained by copolymerizing tetrafluoroethylene with

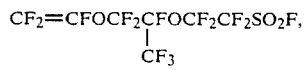

was formed into a film having a thickness of 200 μm, followed by the lamination with the film of the same three component copolymer used in Example 4. The hydrolysis and the measurement of the ohmic loss of the membrane in the same manner as in Example 4. The ohmic loss of the membrane was 0.29 V.

COMPARATIVE EXAMPLE 1

A polymer having an ion exchange capacity of 0.86 meq/g was prepared in the same manner as in Example 1 except that instead of the three component polymer having an ion exchange capacity of 0.86 meq/g, only tetrafluoroethylene and CF$_2$=CFO(CF$_2$)$_3$COOCH$_3$ were copolymerized. The polymer was extruded at 230° C. in an attempt to obtain a film. However, when it was attempted obtain a film having a thickness of at most 100 μm, the film tended to have holes, whereby it was impossible to obtain a thin film as in the case of the three component copolymer.

COMPARATIVE EXAMPLE 2

The ohmic loss of the membrane composed of a single layer of each polymer constituting each layer of the laminated membrane in Example 1 was as shown in the following Table.

| Ion exchange capacity (meq) | Thickness of the membrane (μ) | Ohmic loss (V) |
| --- | --- | --- |
| 1.44 | 280 | 0.19 |
| 0.86 | 280 | 1.0 or more |

Having now fully described the invention, it will be apparent to one of ordinary skill in the art that many changes and modifications can be made thereto, without departing from the spirit or scope of the invention as set forth therein.

What is claimed as new and desired to be secured by Letters patent of the United States is:

1. An electrolytic cation exchange membrane which comprises a first film made of a fluorinated polymer having cation exchange groups and a second film laminated thereon, made of a fluorinated polymer having carboxylic acid groups as its ion exchange groups and containing the following repeating units (A), (B) and (C) and having a smaller thickness and greater specific electric resistance than the first film;

 (A)

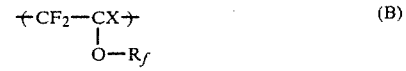 (B)

 (C)

where each of X and X' is —F, —Cl or —CF$_3$, R$_f$ is a perfluoroalkyl group having from 1 to 10 carbon atoms, M is hydrogen or an alkali metal and Y is selected from the group consisting of $+CF_2\overline{)_x}$, $-O+CF_2\overline{)_x}$,

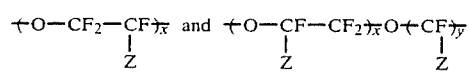

where each of x and y is an integer of from 0 to 10 and Z is —F or $R_f$ as defined above, provided that B/A+B+C (molar ratio) and C/A+B+C (molar ratio) are from 0.01 to 0.3 and from 0.05 to 0.5, respectively.

2. The electrolytic cation exchange membrane according to claim 1 wherein the first and second film are laminated so that the first film is disposed on the anode side and the second film is disposed on the cathode side.

3. The electrolytic cation exchange membrane according to claim 1 or 2 wherein the cation exchange groups of the first film are sulfonic acid groups.

4. The electrolytic cation exchange membrane according to claims 1 or 2 wherein the cation exchange groups of the first film are carboxylic acid groups and having a greater ion exchange capacity than the second film.

5. The electrolytic cation exchange membrane according to claims 1 or 2 wherein the first film has a thickness of from 150 to 500 $\mu$m and the second film has a thickness of from 5 to 50 $\mu$m.

6. The electrolytic cation exchange membrane according to claims 1 or 2, wherein the first film has a thickness of from 2 to 30 times of the thickness of the second film.

7. An electrolytic process for water or an aqueous solution wherein the cation exchange membrane according to claims 1 or 2, is used.

8. The electrolytic process according to claim 7 wherein the aqueous solution is an aqueous alkali metal chloride solution.

9. The electrolytic process according to claim 8 wherein the aqueous alkali metal chloride solution is an aqueous sodium chloride solution.

10. An electrolytic cell for water or an aqueous solution wherein the cation exchange membrane according to claims 1 or 2, is installed.

11. The electrolytic cell according to claim 10 wherein the aqueous solution is an aqueous alkali metal chloride solution.

12. The electrolytic cell according to claim 11 wherein the aqueous alkali metal chloride solution is an aqueous sodium chloride solution.

* * * * *